United States Patent [19]
Castillo

[11] Patent Number: 5,593,643
[45] Date of Patent: Jan. 14, 1997

[54] FCC ARRANGEMENT WITH EXTERNALLY SUSPENDED CATALYST SEPARATION ZONE

[75] Inventor: Ricardo Castillo, Arlington Heights, Ill.

[73] Assignee: UOP, Des Plaines, Ill.

[21] Appl. No.: 365,624

[22] Filed: Dec. 28, 1994

[51] Int. Cl.⁶ .................................................. B01J 8/08
[52] U.S. Cl. ................................. 422/144; 422/143
[58] Field of Search ................................ 422/143, 144

[56] References Cited

U.S. PATENT DOCUMENTS

| | | | |
|---|---|---|---|
| 3,817,872 | 6/1974 | Evans et al. | 252/417 |
| 3,938,960 | 2/1976 | Glasgow et al. | 23/288 |
| 4,295,961 | 10/1981 | Fahriget et al. | 208/161 |
| 4,394,349 | 7/1983 | Cartmell | 422/147 |
| 4,572,780 | 2/1986 | Owen et al. | 208/161 |
| 4,678,642 | 7/1987 | Lee | 422/144 |
| 4,701,307 | 10/1987 | Walters et al. | 422/147 |
| 4,714,541 | 12/1987 | Buyan et al. | 208/161 |
| 4,721,603 | 1/1988 | Krug et al. | 422/147 |
| 4,737,346 | 4/1988 | Haddad et al. | 422/144 |
| 4,786,622 | 11/1988 | Walters et al. | 502/44 |
| 4,792,437 | 12/1988 | Hettinger, Jr. et al. | 422/147 |
| 4,869,880 | 9/1989 | Hettinger, Jr. et al. | 422/147 |
| 5,055,177 | 10/1991 | Haddad et al. | 208/161 |
| 5,141,625 | 8/1992 | Lomas | 208/113 |
| 5,290,430 | 3/1994 | Cetinkaya | 208/161 |

*Primary Examiner*—Timothy McMahon
*Attorney, Agent, or Firm*—Thomas K. McBride; John G. Tolomei

[57] ABSTRACT

This FCC process suspends a layer of catalyst in a riser outside an FCC reactor vessel at a location above a primary riser outlet. The density at the riser outlets is higher than the flowing density in the riser. The suspended catalyst provides a disengagement zone that enhances the separation of catalyst from product vapors. The riser operates in a manner that prevents any discharge of catalyst from its end. The arrangement also provides a convenient method for venting stripping vapors into a closed reactor cyclone system.

2 Claims, 1 Drawing Sheet

FCC ARRANGEMENT WITH EXTERNALLY SUSPENDED CATALYST SEPARATION ZONE

FIELD OF THE INVENTION

This invention relates generally to processes for the fluidized catalytic cracking (FCC) of heavy hydrocarbon streams such as vacuum gas oil and reduced crudes. This invention relates more specifically to a method for reacting hydrocarbons in an FCC reactor and separating reaction products from the catalyst used therein.

BACKGROUND OF THE INVENTION

The fluidized catalytic cracking of hydrocarbons is the main stay process for the production of gasoline and light hydrocarbon products from heavy hydrocarbon charge stocks such as vacuum gas oils or residual feeds. Large hydrocarbon molecules, associated with the heavy hydrocarbon feed, are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium. The FCC process is carried out by contacting the starting material whether it be vacuum gas oil, reduced crude, or another source of relatively high boiling hydrocarbons with a catalyst made up of a freely divided or particulate solid material. The catalyst is transported like a fluid by passing gas or vapor through it at sufficient velocity to produce a desired regime of fluid transport. Contact of the oil with the fluidized material catalyzes the cracking reaction. During the cracking reaction, coke will be deposited on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes of removing the coke by oxidation with an oxygen-containing gas. An inventory of catalyst having a reduced coke content, relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

The rate of conversion of the feedstock within the reaction zone is controlled by regulation of the temperature of the catalyst, activity of the catalyst, quantity of the catalyst (i.e., catalyst to oil ratio) and contact time between the catalyst and feedstock. The most common method of regulating the reaction temperature is by regulating the rate of circulation of catalyst from the regeneration zone to the reaction zone which simultaneously produces a variation in the catalyst to oil ratio as the reaction temperatures change. That is, if it is desired to increase the conversion rate, an increase in the rate of flow of circulating fluid catalyst from the regenerator to the reactor is effected.

The hydrocarbon product of the FCC reaction is recovered in vapor form and transferred to product recovery facilities. These facilities normally comprise a main column for cooling the hydrocarbon vapor from the reactor and recovering a series of heavy cracked products which usually include bottom materials, cycle oil, and heavy gasoline. Lighter materials from the main column enter a concentration section for further separation into additional product streams.

One improvement to FCC units, that has reduced the product loss by thermal cracking, is the use of riser cracking. In riser cracking, regenerated catalyst and starting materials enter a pipe reactor and are transported upward by the expansion of the gases that result from the vaporization of the hydrocarbons, and other fluidizing mediums if present, upon contact with the hot catalyst. Riser cracking provides good initial catalyst and oil contact and also allows the time of contact between the catalyst and oil to be more closely controlled by eliminating turbulence and backmixing that can vary the catalyst residence time. An average riser cracking zone today will have a catalyst to oil contact time of 1 to 5 seconds. A number of riser designs use a lift gas as a further means of providing a uniform catalyst flow. Lift gas is used to accelerate catalyst in a first section of the riser before introduction of the feed and thereby reduces the turbulence which can vary the contact time between the catalyst and hydrocarbons.

Riser cracking whether with or without the use of lift gas has provided substantial benefits to the operation of the FCC unit. These can be summarized as a short contact time in the reactor riser to control the degree of cracking that takes place in the riser and improved mixing to give a more homogeneous mixture of catalyst and feed. A more complete distribution prevents different times for the contact between the catalyst and feed over the cross-section of the riser which would otherwise cause some portions of the feed to contact the catalyst for a longer time than other portions of the feed. Both the short contact time and a more uniform average contact time for all of the feed with the catalyst has allowed overcracking to be controlled or eliminated in the reactor riser.

Unfortunately, much of what can be accomplished in the reactor riser in terms of uniformity of feed contact and controlled contact time can be lost when the catalyst is separated from the hydrocarbon vapors. As the catalyst and hydrocarbons are discharged from the riser, they must be separated. In early riser cracking operations, the output from the riser was discharged into a large vessel. This vessel serves as a disengaging chamber and is still referred to as a reactor vessel, although most of the reaction takes place in the reactor riser. The reactor vessel has a large volume. Vapors that enter the reactor vessel are well mixed in the large volume and therefore have a wide residence time distribution that results in relatively long residence times for a significant portion of the product fraction. Product fractions that encounter extended residence times can undergo additional catalytic and thermal cracking to less desirable lower molecular weight products.

One apparatus that has been known to promote quick separation between the catalyst and the vapors in the reactor vessels is known as a ballistic separation device which is also referred to as a vented riser. The structure of the vented riser in its basic form consists of a straight portion of conduit at the end of the riser and an opening that is directed upwardly into the reactor vessel with a number of cyclone inlets surrounding the outer periphery of the riser near the open end. The apparatus functions by shooting the high momentum catalyst particles past the open end of the riser where the vapor collection takes place. A quick separation between the catalyst and the vapors occurs due to the relatively low density of the vapors which can quickly change directions and turn to enter the inlets near the periphery of the riser while the heavier catalyst particles continue along a straight trajectory that is imparted by the straight section of the riser conduit. The vented riser has the advantage of eliminating any dead area in the reactor vessel where coke can form while providing a quick separation between the catalyst and the vapors. However, the vented riser still has the drawback of operating within a large open volume in the reactor vessel. Thus, the vented riser provides catalyst separation efficiency by promoting a quick disengagement of catalyst particles from the riser gases, but has poor hydrocarbon separation efficiency since a large portion of the hydrocarbons are still carried over into the reactor vessel for an extended period of time.

In an effort to further control the contact time between catalyst and feed vapors, closed coupled cyclones have been used. Close coupled cyclones directly couple cyclones to the end of the reactor riser. This direct coupling of cyclones to the riser provides a quick separation of most of the product vapors from the catalyst. Therefore, contact time for a large portion of the feed vapors can be closely controlled. One problem with directly coupling cyclones to outlet of the reactor riser is the need for a system that can handle pressure surges from the riser. These pressure surges and the resulting transient increase in catalyst loading inside the cyclones can overload the cyclones such that an unacceptable amount of fine catalyst particles are carried over with the reactor vapor into downstream separation facilities. Therefore, a number of apparatus arrangements have been proposed for direct coupled cyclones that significantly complicate the arrangement and apparatus for the direct coupled cyclones, and either provide an arrangement where a significant amount of reactor vapor can enter the open volume of the reactor/vessel or compromise the satisfactory operation of the cyclone system by subjecting it to the possibility of temporary catalyst overloads.

DISCLOSURE STATEMENT

U.S. Pat. No. 5,290,430 discloses a direct coupled cyclone system that suspends catalyst above the main outlets of a riser that is located in an FCC reactor.

U.S. Pat. No. 4,792,437 discloses a ballistic separation device.

U.S. Pat. No. 4,295,961 shows the end of a reactor riser that discharges into a reactor vessel and an enclosure around the riser that is located within the reactor vessel.

U.S. Pat. No. 4,737,346 shows a closed cyclone system for collecting the catalyst and vapor discharge from the end of a riser.

BRIEF DESCRIPTION OF THE INVENTION

This invention is an arrangement for an FCC reactor and an FCC riser that in normal operation suspends a layer of catalyst in a portion of the riser located outside of the reactor vessel. The suspension of catalyst particles is downstream of an riser outlet that directly couples the riser to the cyclones. Another conduit communicates the top of the suspended catalyst disengaging zone with the reactor vessel. The suspension of catalyst provides a suspended disengaging zone that dissipates the energy of the upwardly directed catalyst stream from the riser to retain the separated catalyst particles in the riser until the particles are withdrawn through the cyclone inlets. In this manner the catalyst, and the large amount of entrained vapors that accompany it, is not carried over into the reactor vessel and overcracking is avoided. The suspended disengaging zone also receives stripping gas from the stripping zone in the reactor vessel. Passing the stripping gas through the suspended disengaging zone performs additional stripping of the suspended catalyst by preventing hydrocarbon discharge into the vessel and improves the recovery of product vapors in the cyclone separators. The suspended catalyst disengaging zone also provides the important function of relieving surges of pressure in the riser by discharging catalyst and vapors into the vessel that would otherwise overload the cyclones.

Accordingly in one embodiment, this invention is an apparatus for the fluidized catalytic cracking (FCC) of an FCC feedstock that includes a reactor vessel, at least one catalyst separator located in the reactor vessel, and an upwardly directed riser conduit located outside the reactor vessel. A first transfer conduit communicates a first locus of the riser conduit with the catalyst separator. A second transfer conduit for communicating a second locus of the riser with the reactor vessel, and the second locus is located above the first locus.

Additional objects, embodiments, and details of this invention are disclosed in the following detailed description of the invention.

DETAILED DESCRIPTION OF THE INVENTION

This invention relates generally to the reactor side of the FCC process. This invention will be useful for most FCC processes that are used to crack light or heavy FCC feedstocks. The process and apparatus aspects of this invention can be used to modify the operation and arrangement of existing FCC units or in the design of newly constructed FCC units.

This invention uses the same general elements of many FCC units. A reactor riser provides the primary reaction zone. A reactor vessel and cyclone separators remove catalyst particles from the gaseous product vapors. A stripping zone removes a large percentage of sorbed vapors from the surface of the catalyst. Spent catalyst from the stripping zone is regenerated in a regeneration zone having one or more stages of regeneration. Regenerated catalyst from the regeneration zone is used in the reactor riser. A number of different arrangements can be used for the reactor and regenerator sections. The description herein of specific reactor and regenerator components is not meant to limit this invention to those details except as specifically set forth in the claims.

Figure 1:
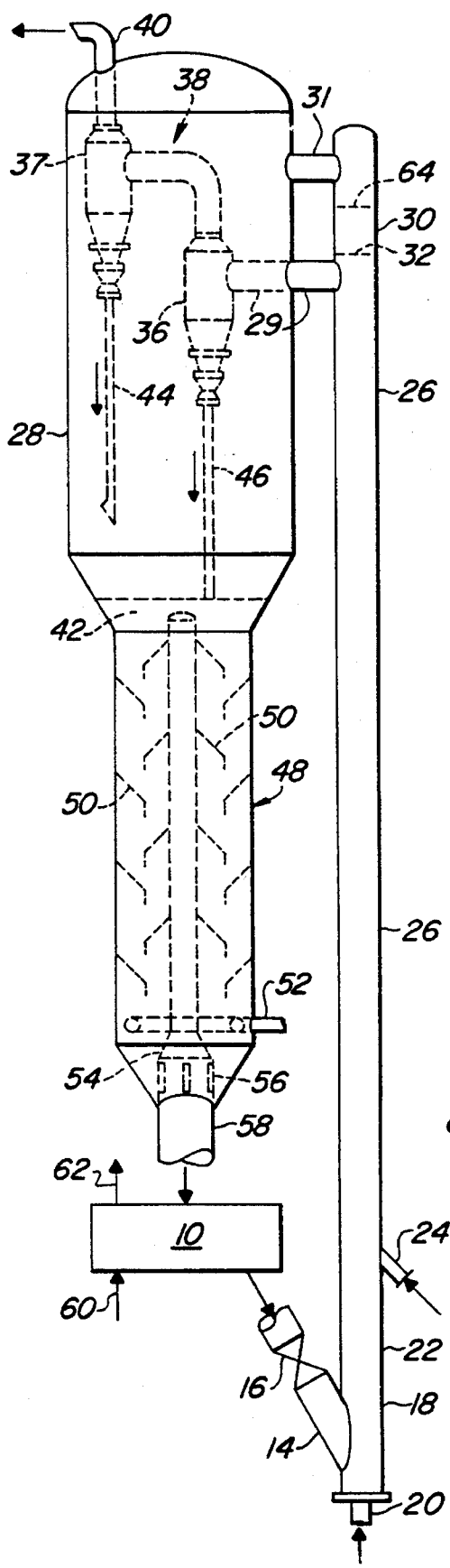
FIG. 1 shows a schematic representation of a reactor/regenerator system for an FCC process arranged in accordance with this invention.

An overview of the basic process operation can be best understood with reference to the FIG. 1. Regenerated catalyst from a regeneration zone 10 is transferred by a conduit 14, at a rate regulated by a control valve 16, to a Y-section 18. Lift gas injected into the bottom of Y-section 18, by a conduit 20, carries the catalyst upward through a lower riser section 22. Feed is injected into the riser above lower riser section 22 by feed injection nozzles 24. The drawing shows this invention being used with a riser arrangement having a lift gas zone 22. It is not necessary that a lift gas zone be provided in the riser in order to enjoy the benefits of this invention.

The mixture of feed, catalyst and lift gas travels up an intermediate section of the riser 26 and passes into a reactor vessel 28 via a lower transfer conduit 29. The conduit 29 extends into reactor vessel 28 and connects the riser directly with a first stage 36 of two sets of cyclone separators 38. Together with riser sections 26 and 22 form a first portion of the riser. The first portion of the riser empties a portion of the mixture of catalyst and gaseous components into a second portion 30 of the riser. The term "gaseous components" includes lift gas, product gases and vapors, and unconverted feed components.

During normal operation an interface 32 is formed between the first portion and the second portion of the riser. An upper transfer conduit at the top of riser portion 30 communicates the upper end of riser portion 30 with the upper end of the reactor vessel 28. The upper end of portion 30 receives a stripping vapor stream through the upper conduit 31. The withdrawal of catalyst and gaseous components into cyclone 36 via conduit 29 dissipates the energy of the catalyst and gas mixture traveling upward through the riser so that interface 32 is formed between a lower density catalyst region in the first portion of the riser and a higher catalyst density in the portion of the riser above the outlet for conduit 29. Stripping gas entering from conduit 31 entering the upper portion of the riser also passes through the region of higher catalyst density in riser section 30 and is withdrawn by conduit 29.

Riser section 30 defines a disengagement chamber that operates as a disengaging zone. Gaseous components are separated from catalyst particles by the cyclone separators 38. Gaseous products and catalyst pass from conduit 29 through the first stage cyclone 36 and then to the second stage cyclone 37. Gaseous reactor products are recovered overhead from the second stage cyclone 37 by line 40 and separated catalyst particles are returned to a dense bed 42 by dip-leg 44 from the first stage cyclones and second stage dip leg 46 from the second stage cyclones.

Spent catalyst and entrained and adsorbed hydrocarbons flow downwardly from bed 42 into a stripper 48. As catalyst flows downwardly through stripper 48, it is cascaded back and forth by a series of baffles 50. Steam is injected into a lower portion of the stripper by a distributor 52, and passes upwardly in counter-current flow to the downwardly cascading stream of catalyst. A nozzle 54 withdraws catalyst from the bottom of the stripping zone 48 via a plurality of openings 56 and transfers the catalyst to the catalyst regenerator section 10 by a line 58.

An oxygen-containing stream carried by line 60 contacts the catalyst in the regenerator and combusts coke from the catalyst thereby producing a flue gas stream of coke combustion by-products removed from the regenerator by a line 62 and provides the regenerated catalyst having a reduced concentration of coke. Any wellknown regenerator arrangement for removing coke from the catalyst particles by the combustion of coke and returning catalyst particles to the reactor riser can be used and the particular details of the regeneration zone are not an important aspect of this invention.

The riser of this invention as arranged provides a unique region of catalyst and gas separation. Looking now at the operation of the upper portion of the riser, as depicted in FIG. 1, catalyst travels up the first portion of the riser and through riser section 26 in a typical plug flow manner and at a velocity of between 20 to 100 ft/sec with a catalyst density of between 1 to 5 lb/ft$^3$. The relatively uniform upward flow of the catalyst continues until it reaches the elevation of the conduit 29. The energy of the gas and catalyst stream that travels up the riser immediately begins to dissipate when it reaches the elevation of the riser outlet provided by the conduit 29 due to the loss of pressure from the withdrawal of the gas and catalyst. However, the momentum of the gas and catalyst mixture continues to carry a majority of the catalyst and some of the gas upwardly past the outlet defined by conduit 29. The second portion of the riser is that portion where the velocity of the catalyst mixture passing up the riser begins to decrease due to the withdrawal of catalyst and gas from the riser. As the velocity of the catalyst particles continues to decay with the loss of the driving pressure, the relatively slower velocity of the particles that pass above the outlet defined by conduit 29 increases the residence time of the catalyst particles in the disengaging zone.

The disengaging zone is generally that portion of the riser that contains catalyst and is located above interface 32. This increased residence time of catalyst passing into the disengaging zone increases the catalyst density in the disengaging zone relative to the first portion of the riser. The momentum of the upwardly flowing catalyst and gas particles keeps the higher density region of catalyst suspended above the outlet defined by conduit 29. The upward momentum of catalyst particles as they travel past the conduit 29 impacts a force on the higher density catalyst in the disengaging zone that also supports the higher density region of catalyst above the riser conduit 29. There is a constant exchange of catalyst particles across interface 32 as newer particles passing up the riser have the momentum to cross the interface 32 and rise to top of the disengaging zone pushing other catalyst particles downwardly below the interface and into outlets 34. Any gaseous components from the riser and from the stream of stripping fluid that enters through the top of the riser through conduit 31 also pass continually downward into outlet defined by conduit 29. For the sake of further definition, the disengaging zone of the riser refers to that part of the riser where there is a substantial decrease in the velocity of the catalyst and gaseous mixture flowing up the riser and/or where a conduit withdraws catalyst and gaseous components for separation in the separation device.

Therefore, as the mixture of gaseous components and catalyst flows up the riser, a change in velocity and density occurs as it passes into the second portion of the riser and across the interface 32. Catalyst in the first portion of the riser will have a velocity in a range of from 20 to 100 ft/sec and will have a density in a range of from 1 to 5 lb/ft$^3$. Once the catalyst and gaseous components flow past the interface the density increases by at least 10% and more typically to at least 5 to 20 times the density in the first portion of the riser.

The downward flow of stripping gas and the continual shooting of particles through the interface into the upper section of disengaging zone keeps catalyst and gases circulating downwardly out of disengaging zone. The interface 32 and the higher density of catalyst particles in the disengaging zone aids in the stripping of hydrocarbon vapors from the catalyst before it enters the outlets 34. The relatively higher catalyst density of the disengaging zone provides a contacting zone that allows the stripping vapors to perform additional stripping of the catalyst particles prior to its entering into the cyclones.

Catalyst withdrawn from the riser by conduit 29 may enter any type of a separation device that will complete the separation of the product gases from the catalyst. Typically, the conduit will feed the catalyst and gaseous mixture to a one or more stages of cyclone separators. Whatever separation device is used, it should be of a type that is directly connected to the conduit that communicates the external cyclones with the cyclones in the reactor vessel and is substantially closed in order to prevent the reentry of gaseous components into the dilute phase of the reactor vessel. When cyclone separators are used, it can be either a single stage cyclone or a two-stage cyclone as depicted in FIG. 1. The separators will operate in an ordinary manner separating gaseous components from the catalyst and removing gaseous products from the reactor vessel while returning separated catalyst to a stripping zone. The separator connected to the riser outlet may also be located outside the reactor vessel 28.

Suitable stripping zones for this invention will be any type that can remove adsorbed hydrocarbons from the catalyst. In most cases, the stripping zone will consist of the usual baffle arrangement as shown in FIG. 1 wherein the catalyst particles are contacted countercurrently to an upward flow of stripping steam. The amount of stripping steam used in this process will be in the usual range, used for FCC operations and will normally vary between 1 to 3 lb of steam per 1000 lb of catalyst.

Figure 2:
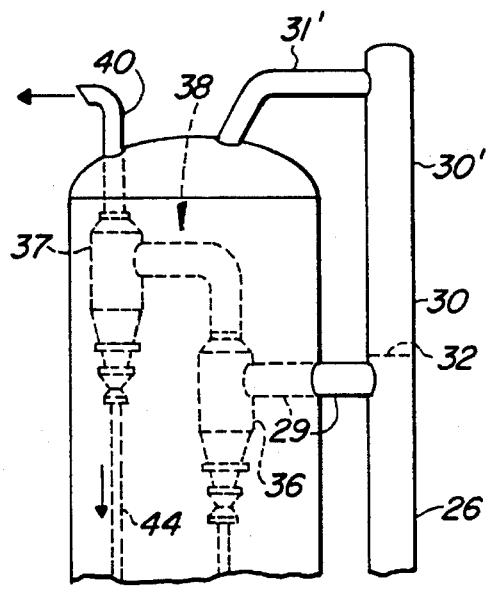
FIG. 2 depicts a modification to the upper portion of the reactor vessel shown in FIG. 1.

The disengaging zone at the upper end of the riser has an arrangement that will prevent catalyst from flowing out of the riser upper section of the riser under normal operating conditions, but permits catalyst to overflow from conduit 31 during temporary upset or pressure surge conditions. Catalyst is contained in the disengaging zone of the riser by providing an extended length of riser between the conduits 30 and 31. For some applications this length may be as little as one riser diameter while, more typically, it will be at least two riser diameters. However, in many cases, a simple extended end may require more length between conduits 30 and 31 than is available over the length of the reactor vessel.

Where additional riser length is needed above the opening for conduit 29 the upper portion of the riser may contain a baffle 64 across the riser between the openings for conduits 29 and 31. The baffle only partially blocks the flow area of the upper portion of the riser. Partial occluding of the flow area contributes to the dissipation of the energy from the catalyst stream and thereby reduces the necessary length of the disengaging zone between conduits 29 and 31 that is needed to prevent vapors and catalyst from flowing out the conduit 31 during normal operating conditions.

Where additional length of riser is needed the riser may also extend above the reactor vessel in the manner shown in FIG. 2. In this arrangement the conduit 31' extends downwardly from an extended upper end section 30' of the riser to communicate the riser with the reactor vessel. Extending the riser upwardly so that the conduit 31' communicates with the top of the reactor vessel has the added advantage of keeping the upper portion of the reactor vessel active and thereby avoiding coke build-up in the top of the reactor.

The foregoing description sets forth essential features of this invention which can be adapted to a variety of applications and arrangements without departing from the scope and spirit of the claims hereafter presented.

I claim:

1. An apparatus for the fluidized catalytic cracking (FCC) of an FCC feedstock, said apparatus comprising:

a) a reactor vessel;

b) at least one catalyst separator located in said reactor vessel;

c) an upwardly directed riser conduit located outside said reactor vessel and extending above said reactor vessel;

d) a first transfer conduit for communicating a first locus of said riser conduit with said catalyst separator;

e) a second transfer conduit for communicating a second locus of said riser with said reactor vessel, wherein said second locus is located above said first locus and said second transfer conduit communicates with a portion of said riser located above said reactor vessel.

2. The apparatus of claim 1 wherein said separator comprises at least one cyclone separator.

\* \* \* \* \*